US008005851B2

(12) United States Patent
Sheehan et al.

(10) Patent No.: US 8,005,851 B2
(45) Date of Patent: Aug. 23, 2011

(54) STREAMING VIRTUAL DISK FOR VIRTUAL APPLICATIONS

(75) Inventors: John M. Sheehan, Somerville, MA (US); Kristofer H. Reierson, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 590 days.

(21) Appl. No.: 12/124,154

(22) Filed: May 21, 2008

(65) Prior Publication Data
US 2009/0293054 A1    Nov. 26, 2009

(51) Int. Cl.
*G06F 17/30* (2006.01)
(52) U.S. Cl. ........................................ 707/758; 711/203
(58) Field of Classification Search ................... 707/758, 707/823, 831; 711/203, E12.016
See application file for complete search history.

(56) References Cited

U.S. PATENT DOCUMENTS

| 6,735,601 | B1 | 5/2004 | Subrahmanyam |
| 7,197,570 | B2 | 3/2007 | Eylon et al. |
| 2002/0147862 | A1* | 10/2002 | Traut et al. ........................ 710/1 |
| 2005/0050342 | A1 | 3/2005 | Boivie et al. |
| 2005/0125593 | A1 | 6/2005 | Karpoff et al. |
| 2006/0031547 | A1 | 2/2006 | Tsui et al. |
| 2006/0117172 | A1 | 6/2006 | Zhang et al. |
| 2006/0150239 | A1 | 7/2006 | Fujimori et al. |
| 2006/0155667 | A1 | 7/2006 | Tolba |
| 2006/0218544 | A1* | 9/2006 | Chakraborty et al. ........ 717/168 |
| 2006/0259581 | A1 | 11/2006 | Piersol |
| 2007/0180257 | A1 | 8/2007 | Bae et al. |
| 2007/0192329 | A1 | 8/2007 | Croft et al. |

OTHER PUBLICATIONS

Giffin et al, Strengthening Software Self-Checksumming via Self-Modifying Code, 2005 ACSAC, pp. 1-12.*
Chu, "Ardence Software Deploys Flexibility", Mar. 14, 2005, eWEEK, pp. 64-65.
"Unified Application Delivery Infrastructure", 2007, Citrix Systems, Inc., pp. 1-8.
"Microsoft Validates Application Streaming with Softricity Buy", May 26, 2006, DABCC, pp. 3.

* cited by examiner

*Primary Examiner* — Fred I Ehichioya
(74) *Attorney, Agent, or Firm* — Russell S. Krajec; Krajec Patent Offices, LLC

(57) ABSTRACT

A sparsely populated, streaming virtual disk may be used with a virtual application to enable fast launching of a virtual application from a network server. The virtual disk may be configured and populated in blocks, enabling those blocks that are used at a particular time to be downloaded and stored in the virtual disk. As other blocks are requested by the virtual application, those blocks may be fetched from the network server. Each block may be validated using a hash tree or some other function so that the recipient may verify authenticity and completeness. In some embodiments, a virtual application may be configured and deployed as a single file, enabling simple version control among other things.

19 Claims, 3 Drawing Sheets

STREAMING VIRTUAL DISK FOR VIRTUAL APPLICATIONS

BACKGROUND

Virtual applications are computer programs that may be executed in an application layer that is separate from the operating system layer. Virtual applications may enable an application to be executed on clients without being installed and to be administered from a central location.

Every application depends on its OS for a range of services, including memory allocation, device drivers, and much more. Incompatibilities between an application and its operating system can be addressed by either server virtualization or presentation virtualization. Application virtualization may address incompatibilities between two applications installed on the same instance of an operating system.

Applications installed on the same device commonly share configuration elements, yet this sharing can be problematic. For example, one application might require a specific version of a dynamic link library (DLL) to function, while another application on that system might require a different version of the same DLL. Installing both applications creates a situation where one of the applications may overwrite the version required by the other causing one of the applications to malfunction or crash. To avoid this, organizations often perform extensive compatibility testing before installing a new application, an approach that's workable but quite time-consuming and expensive.

Application virtualization may create application-specific copies of all shared resources. Each application may have a separate configuration of potentially shared resources such as registry entries, dynamic linked libraries, and other objects that may be packaged with the application. The package may be executed in a cache, creating a virtual application. When a virtual application is deployed, it uses its own copy of these shared resources.

A virtual application may be more easily deployed. Since a virtual application does not compete for dynamic linked library versions or other shared aspects of an application environment, compatibility testing may be reduced or eliminated. In many instances, some applications may be used in a virtual manner while other applications may be operated natively.

SUMMARY

A sparsely populated, streaming virtual disk may be used with a virtual application to enable fast launching of a virtual application from a network server. The virtual disk may be configured and populated in blocks, enabling those blocks that are used at a particular time to be downloaded and stored in the virtual disk. As other blocks are requested by the virtual application, those blocks may be fetched from the network server. Each block may be validated using a hash tree or some other function so that the recipient may verify authenticity and completeness. In some embodiments, a virtual application may be configured and deployed as a single file, enabling simple version control among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
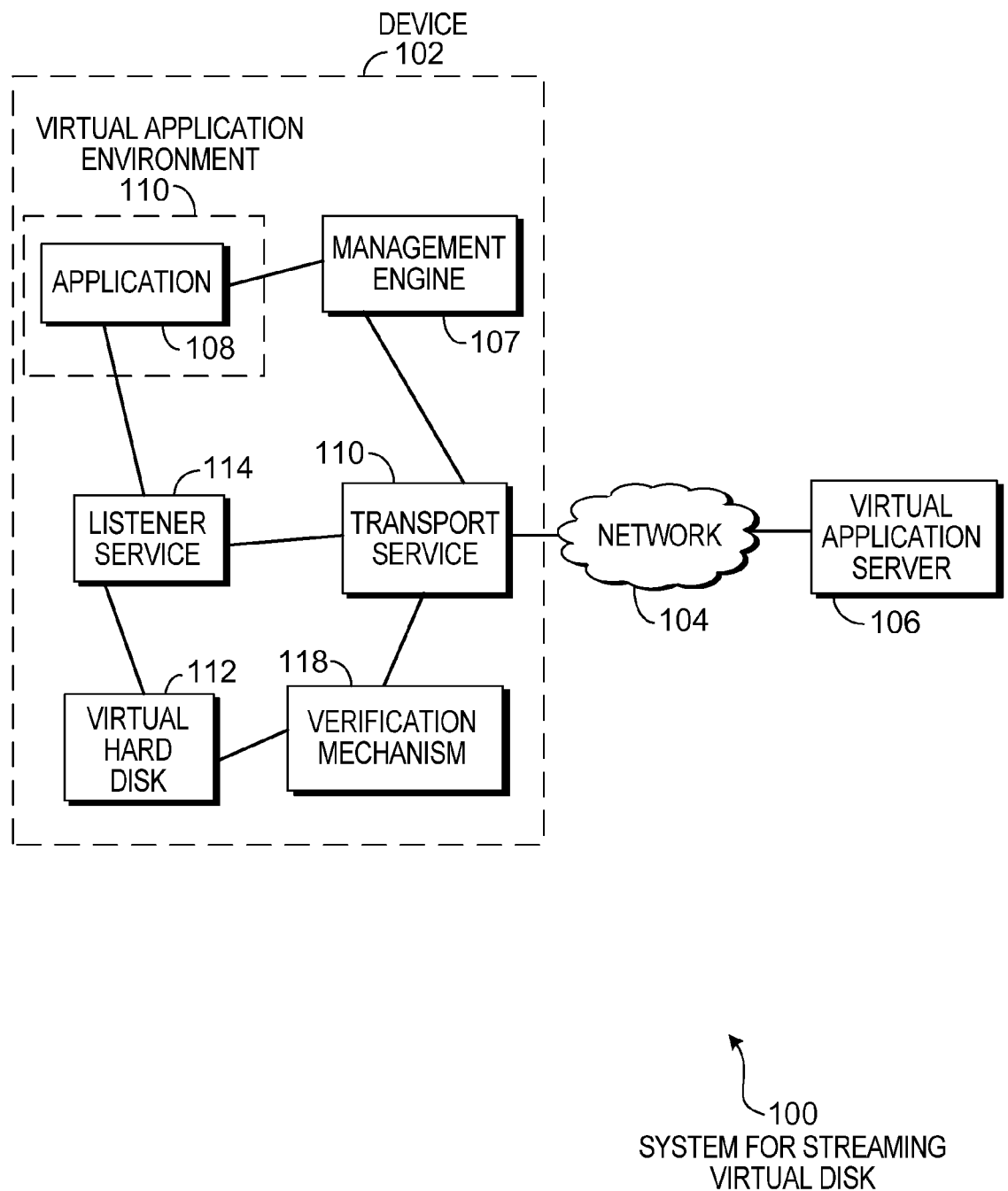
FIG. 1 is a diagram illustration of an embodiment showing a system for virtual application execution with a streaming virtual hard disk.

A virtual application may be operated using streaming virtual disk that may be transmitted to a client device in blocks. The virtual application may be configured such that the first subset of blocks may be sufficient to enable the virtual application to start operation without having to download the complete application. As the virtual application executes, additional blocks may be downloaded on demand while some blocks may be downloaded in a prophylactic manner. The virtual disk may not be fully populated but may be stored on the client device so that the virtual application may be restarted without delay.

A client device may have a management engine that may launch a virtual application in a virtual application environment. Prior to launching the application, a query may be placed to a virtual application server to determine if a locally saved version of the virtual application, if one exists, is the current version. If not, a transport mechanism may download a subset of blocks that make up the virtual application and store the blocks in a virtual hard disk. The application may be launched with merely the subset of blocks.

During operation of the virtual application, additional blocks may be downloaded from the virtual application server either on demand or prophylactically. The virtual hard disk may be saved or persisted on the client device in an incomplete state where some of the blocks are missing. The virtual hard disk may be used to restart the virtual application using the sparsely populated virtual hard disk.

Authentication and verification of each individual block of the virtual application may be accomplished using a hash tree or some other authentication and verification system.

The streaming virtual hard disk may be presented to the virtual application as a file system comprising the various files used by the virtual application. From within the virtual environment, the virtual hard disk may appear as a normal file system. From the host environment, the virtual hard disk may appear as a single large file made up of a number of blocks.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a streaming virtual hard disk for use with virtual applications. Embodiment 100 is an example of a system that may implement a virtual application as a single file that may be provided by a sparsely populated virtual hard disk.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a virtual application that may be executed with a sparsely populated virtual hard disk. The virtual application may be launched when only a subset of the blocks used to define the virtual application is present. As additional blocks are requested by the virtual application, those blocks may be accessed from the virtual hard disk if those blocks are already present. If the blocks are not present, the blocks may be fetched from a virtual application server.

The virtual application may be defined in a single file within the host environment of the device 102. By creating a single file that represents the virtual application, the file may be managed using conventional block by block manipulation techniques that may exist in various operating systems.

An application may be virtualized by a packaging function. The packaging function may identify all the related files that are called by an application, then create a single file that may contain the related files. The single file may be comprised of many blocks and may be manipulated as a single, sparsely populated file in a virtual hard disk.

A virtual hard disk as used in this specification and claims is a software representation of a hard disk storage device. The virtual hard disk may appear to a virtual environment as a storage device such as a conventional hard disk, and the virtual hard disk may be stored as a single file within a host operating system. Thus, a host operating system may be able to manipulate the virtual hard disk as a very large file, but a virtual application may access the virtual hard disk as if the virtual hard disk were a conventional file storage system through a virtual hard disk interface.

A virtual application may operate in a virtual environment within an operating system. In many embodiments, a virtual application may have a virtual application environment where the virtual application may be executed within an environment where application-specific copies of shared resources are managed.

In other embodiments, an application may be operated in a virtual machine environment where an operating system may be executed along with the application in a virtual environment. In such a case, a host device may have one operating system executing on a physical hardware platform and a second operating system executing in a virtual machine. In such an embodiment, the application may operate within the second operating system.

Embodiment 100 is an example of a system for operating a virtual application with a streaming virtual disk. Embodiment 100 may use a virtual hard disk for providing files and data to a running virtual application. Outside of the virtual environment, the virtual hard disk may be managed as a single sparsely filled file, with a system for detecting which blocks may be requested and a mechanism for retrieving the blocks from a virtual application server.

Device 102 may connect through a network 104 to a virtual application server 106. The virtual application server 106 may serve applications to client devices such as device 102. In some embodiments, a virtual application server 106 may serve an application to many tens, hundreds, or even thousands of client devices.

Embodiment 100 is an example of a system where a virtual application may be 'streamed' to the client device. A small portion of an application may be downloaded to the client device when a virtual application is launched, and then subsequent parts of the virtual application may be downloaded as requested.

By transmitting a small portion or subset of the entire application, an application may be launched without having to download all of the data and files associated with the application. In some cases, applications may be several gigabytes of information. By launching an application with a subset of the entire application, a user experience may be started and may enable the user to begin functioning.

The data that are transmitted to the device 102 may be stored in the file that represents the virtual hard disk and used to restart the virtual application at a later time. In some cases, the unused portions of the virtual hard disk may be downloaded as a background process and may slowly be populated over time.

In some embodiments, the virtual application server 106 may be queried to determine if a local virtual hard disk contains the current version of the application. If a new version is available, a portion of the new version may be downloaded so that the new version of the application may be started and subsequent portions may be downloaded as requested or as a background process.

The device 102 may be any type of device that is capable of executing a virtual application. In a typical office or enterprise environment, the device 102 may be a desktop or laptop personal computer. In a datacenter environment, the device 102 may be a server computer. In other embodiments, the device 102 may be a portable or mobile device such as a mobile telephone, a personal digital assistant, a handheld scanning device, or other portable device.

The network 104 may be any type of communications network. In some embodiments, the network 104 may be a local area network. An example may be when the device 102 and virtual application server 106 are used within a company or enterprise. Such networks may have portions of the network 104 that are hard wired or wireless.

In some embodiments, the network 104 may be at least partially comprised of the Internet. In such embodiments, the virtual application server 106 and the device 102 may communicate over an open and insecure network.

The device 102 may have a management engine 107 that may launch the application 108 in a virtual environment 110 and may perform other management functions. The management engine 107 may operate outside of the virtual environment 110 and may provide version control and initial launching of other management functions.

The device 102 may have several management functions that may operate as applications, services, or functions within a host operating system. The host operating system is used to designate an operating system outside of the virtual application environment 110. In some cases such as when a virtual application environment is used, the host operating system may have common elements with the virtual application environment. When a virtual machine environment is used, a separate operating system may be operating in a virtual environment, and the separate operating system may be a separate instance of the host operating system or a different operating system.

The management functions operating in the host operating system may perform the functions of providing the requested portions of the file used by the virtual hard disk 112. A listening service 114 may intercept or monitor requests between the virtual application environment 110 and the virtual hard disk 112. If the requested portions of the file representing the virtual hard disk 112 are not present, the transport service 110 may request those portions from the virtual application server 106.

The transport service 110 may handle communications with the virtual application server 106 and may fetch portions of data in two modes. In a first mode, the transport service 110 may request blocks of data that may be used immediately. Such requests may come at an initial request for the virtual application 108 or when previously unused functions or portions of the virtual application 108 are requested.

In such a mode, the transport service 110 may be operated for efficiency and speed, as the sooner the requested portions of the virtual application are downloaded, the sooner the application may perform a specific function.

In a second mode, the transport service 110 may operate to prophylactically download portions of the virtual application. In the second mode, the transport service 110 may operate as a background process and may consume less bandwidth or processing capabilities. In such a mode, the transport service 110 may work in conjunction with the listener service 114 to predict which portions of the virtual applications are likely to be used and download those portions before others. In some embodiments, the transport service 110 may not use any prediction mechanism and merely download any previously undownloaded portions as a background process.

The virtual hard disk 112 may be configured as a storage device accessible from the virtual application environment 110. The virtual application environment 110 may access the virtual hard disk 112 as a group of individual files that may be contain and may be called by the virtual application 108. From the virtual application environment 110, the virtual hard disk 112 may operate as a file system.

The virtual hard disk 112 may be configured as a single file with respect to the host operating system and the functions of the listener service 114 and the transport service 110. As a single file, the single file underlying the virtual hard disk 112 may be composed of many blocks, each being a portion of the overall file.

The listener service 114 may identify the blocks of the virtual hard disk file that may be requested from within the virtual application environment 110. Those blocks may be requested through the transport service 116 and stored in the virtual hard disk 112.

In some embodiments, each block that is received from the virtual application server 106 may undergo a verification mechanism 118 that may verify the integrity of the incoming blocks. In some cases, a checksum or other analysis may be used to verify that the block was properly transmitted. In other cases, a hash tree or Merkle tree may be used to verify both the proper transmission and authentication of the incoming blocks.

By using a hash tree, each block may be verified that it is a true copy of the original and that the sender is the proper sender. The hash tree and other encryption mechanisms may also be used to ensure that the device 102 is properly authorized to use the downloaded material.

Figure 2:
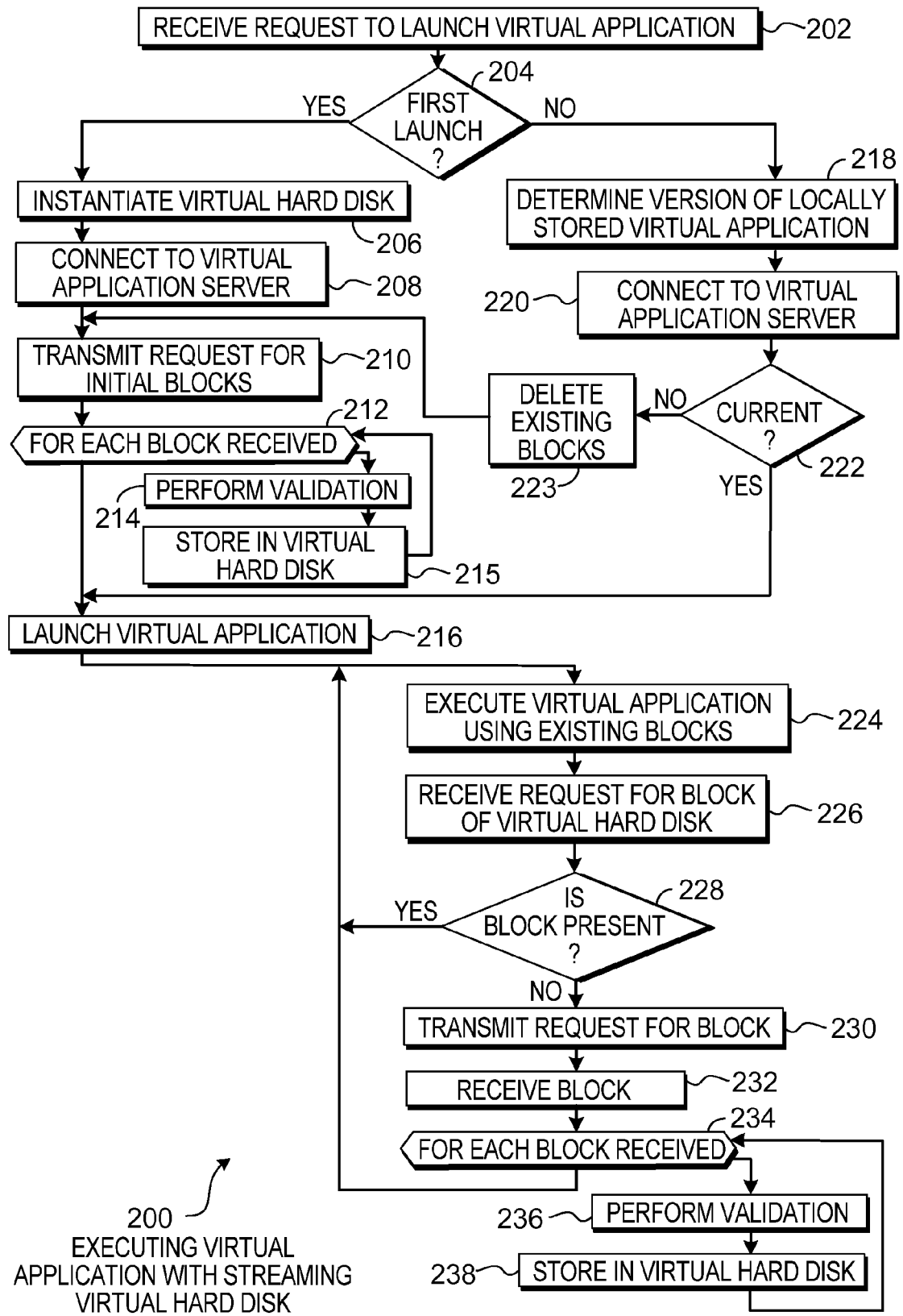
FIG. 2 is a flowchart illustration of an embodiment showing a method for executing a virtual application with a streaming virtual hard disk.

FIG. 2 is a flowchart illustration of an embodiment 200 showing a method for executing a virtual application with a streaming virtual hard disk. Embodiment 200 is a simplified example of a method for downloading a subset of blocks that may make up a single file that defines the contents of a virtual hard disk to enable a virtual application to begin operations. As additional blocks are requested, those blocks may be downloaded and added to the virtual hard disk.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of a method that may be used for operating a streaming virtual hard disk that is used by a virtual application. In many embodiments, the virtual application may operate without detecting that a requested block within the virtual hard disk is not present. Various management functions may reside in a host operating system that may manage the data underlying the virtual hard disk. As a block of data is requested from the virtual hard disk, the block may be read from the virtual hard disk if it is present, otherwise the block may be requested from a virtual application server.

A request may be received to launch a virtual application in block 202. In many embodiments, a host operating system may include mechanisms by which a user or other application may cause a virtual application to be launched. In an example of a desktop computer, a virtual version of a word processor application may be launched when the user double clicks on an icon or selects the word processor from a menu.

If the application is being launched for the first time in block 204, a virtual hard disk may be instantiated in block 206. The virtual hard disk of block 206 may be created to contain all of the various files that may be used by the virtual application from a virtual application environment. In many embodiments, the host operating system may interface with the virtual hard disk as if the virtual hard disk were a storage device containing a file system.

The host operating system may interface with the virtual hard disk as a single, sparsely populated file. In a sparsely populated file, some of the blocks may be present while other blocks may be missing.

A connection may be made to the virtual application server in block 208 and a request for an initial subset of blocks may be transmitted in block 210. The initial subset of blocks may be predefined at the virtual application server as those blocks that may enable the virtual application to begin execution.

In many embodiments, the initial subset of blocks may enable the virtual application to begin execution. In some embodiments, the initial subset of blocks may enable a user to perform basic functions of an application. For example, a word processing application may have a subset of blocks that enables a user to load a document and perform some basic editing functions. The initial subset of blocks may not include advanced functions such as spell checking or table layouts. When an advanced function is selected, the blocks associated with the function may be requested and executed.

For each block received in block 212, a validation may be performed in block 214. In many embodiments, a Merkle tree or hash tree may be used to assign a hash value to each block that may be downloaded. Some embodiments may protect against unintentional damage and may use checksums or cyclical redundancy checks. Other embodiments may use cryptographic hashes, such as SHA-1, Whirlpool, or Tiger for the hashing.

A hash tree may be composed of a top hash or master hash. In many embodiments, the master hash may be digitally signed. A client device may acquire the master hash from a virtual application server or from a trusted source before downloading. As blocks are received, the hash of the block may be checked against the master hash.

Hash trees may enable efficient downloading of small blocks of data, and if a block of data is damaged, it may be redownloaded. When the hashes are arranged in a tree, one small branch of the tree may be downloaded quickly and the integrity of the branch may be checked, and the individual blocks may be checked against the portion of the hash tree.

After validation in block 214, the blocks may be stored in the virtual hard disk in block 215. In many embodiments, the various downloaded blocks may be stored in the virtual hard disk as a sparsely populated file.

After the blocks are downloaded, checked, and stored, the virtual application may be launched in block 216.

If the request to launch a virtual application in block 202 is not the first launch in block 204, the version identifier of a locally stored virtual application may be determined in block 218. A connection may be made to the virtual application server in block 220 and the local version identifier may be transmitted to the virtual application server. If the local version is the current version in block 222, the virtual application may be launched in block 216

If the local version is not the current version in block 222, the existing blocks in the virtual hard disk may be deleted in block 223 and the process may continue with block 210.

The virtual application may be launched in a virtual environment in block 216. In some cases, the virtual environment may be a virtual machine environment while in other cases a virtual application environment may be used.

The virtual application may be executed in block 224 using the existing blocks of data in the virtual hard disk. In block 226, a request for a block within the virtual hard disk is received. If the block is present in block 228, the process may continue with block 224.

If the block is not present in block 228, a request for the block may be transmitted to the virtual application server in block 230 and received in block 232. For each of the blocks received in block 234, a validation may be performed in block 236 and the block may be stored in the virtual hard disk in block 238. The validation of block 236 may be similar to the validation of block 214. After loading the virtual hard disk with the newly requested blocks in blocks 228 through 238, the process may continue in block 224.

Figure 3:
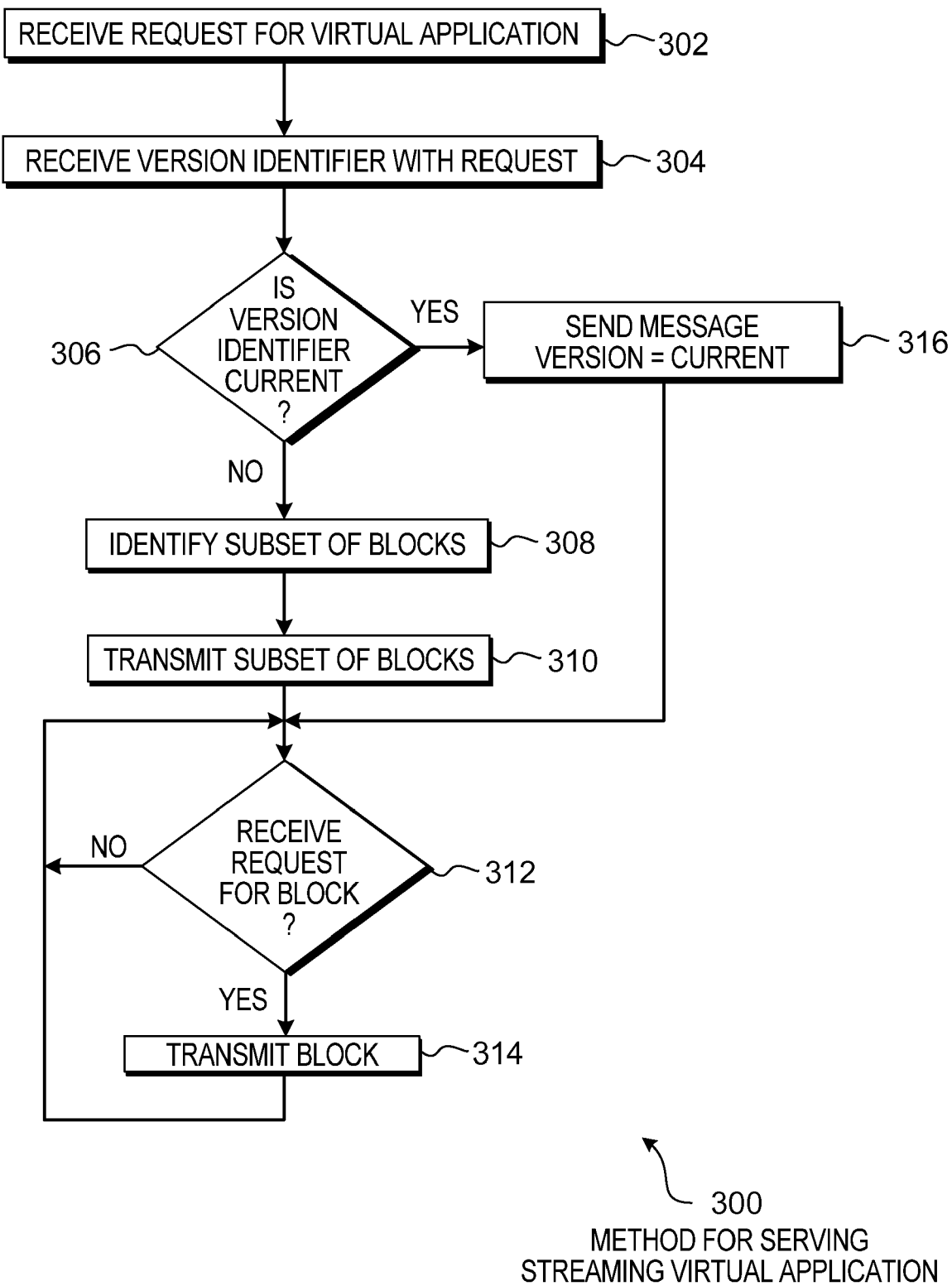
FIG. 3 is a flowchart illustration of an embodiment showing a method for serving a streaming virtual hard disk.

FIG. 3 is a flowchart illustration of an embodiment 300 showing a method for serving a streaming virtual hard disk for a virtual application. Embodiment 300 is a simplified example of the operations that a virtual application server may perform when responding to requests from a client device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a sequence that may be performed by a virtual application server to support a streaming virtual hard disk. When a new virtual application or an updated version of a virtual application may be requested, a subset of blocks for the virtual hard disk may be transmitted to the client device. After the initial subset is downloaded, a responder may transmit other blocks on an as-requested basis.

A request for a virtual application may be received in block 302. In many embodiments, a request for a virtual application may be accompanied by various credentials for authentication. Some virtual application servers may permit or deny a request after determining the device's or user's identity and whether or not the device or user is permitted access to the virtual application.

A version identifier may be received in block 304. If the version identifier is the current version in block 306, a message may be sent to the requesting device in block 316 that the device's version is the current version.

If the device does not supply a current version identifier in block 306, a subset of blocks may be identified in block 308 and transmitted in block 310. The subset of blocks may be a portion of the total virtual application that may enable the virtual application to begin functioning in a virtual environment.

When a request is received for a block of the virtual application in block 312, block may be transmitted in block 314. In some cases, the request in block 312 may be for a block that is to be used immediately. In other cases, the request in block 312 may be for a block that may potentially be used in the future. In the first case, the request may be identified as an urgent request and the block may be transmitted in a high speed manner. In the second case, the request may be identified as a low priority request and the block may be transmitted using a lower priority scheme.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer readable storage medium comprising computer readable instructions configured to perform a method comprising:
   receiving a first start request to launch a virtual application;
   instantiating a virtual hard disk comprising a single file, said single file being comprised of a plurality of blocks;
   establishing a connection to a virtual application server;
   retrieving a first subset of said blocks from said virtual application server, said first subset being less than said single file;
   launching said virtual application using said subset of said blocks;
   performing at least one validation on each of said blocks in said first subset;
   storing said blocks in said virtual hard disk;
   detecting a request for a second block;
   determining that said second block is not present in said virtual hard disk;
   sending a request to said virtual application server for said second block;
   receiving said second block;
   performing said at least one validation on said second block;
   storing said second block in said virtual hard disk; and
   enabling said second block to be called by said virtual application.

2. The computer readable storage medium of claim 1, said single file being created from a plurality of individual files.

3. The computer readable storage medium of claim 2, said second block being comprised in one of said individual files.

4. The computer readable storage medium of claim 3 said method further comprising:
   mapping said one of said individual files to said second block.

5. The computer readable storage medium of claim 1 said method further comprising:
   receiving a second start request for said virtual application;
   determining that at least said first subset of blocks are present in said virtual hard disk; and
   launching said virtual application using said virtual hard disk without downloading any of said blocks from said virtual application server.

6. The computer readable storage medium of claim 5 said method further comprising:
   accessing said virtual application server to determine a current version identifier of said virtual application; and
   determining that said current version identifier is the same as a version identifier of said virtual application as stored in said virtual hard disk.

7. The computer readable storage medium of claim 1 said method further comprising:
   receiving a stop command for said virtual application; and
   persisting said virtual hard disk comprising said first subset of said blocks, said virtual hard disk comprising an incomplete set of said blocks of said file.

8. The computer readable storage medium of claim 1, at least a portion of said blocks being noncontiguous.

9. The computer readable storage medium of claim 1, said at least one validation comprising using a hash tree.

10. The computer readable storage medium of claim 1, said at least one validation comprising using a checksum.

11. The computer readable storage medium of claim 1, said single file having a strong identity.

12. The computer readable storage medium of claim 11, said strong identity comprising a Globally Unique Identification.

13. A system comprising:
    a virtual hard disk;
    a management engine operating on a computer processor configured to:
      receive a first start request to launch a virtual application, said virtual application operating within an application layer separate from an operating system layer;
      establish a connection to a virtual application server;
      determine that said virtual application is comprised in a first file;
      determine that a first subset of blocks of said file will be used to launch said virtual application;
    a transport mechanism configured to:
      retrieve a first subset of said blocks from said virtual application server, said first subset being less than said single file; and
      store said first subset of said blocks in said virtual hard disk;
    a virtual application environment configured to launch said virtual application using said first subset of said blocks from said virtual hard disk.

14. The system of claim 13 further comprising:
    a verification mechanism configured to verify each of said blocks.

15. The system of claim 13 further comprising:
    a listening service configured to:
      detect a request for a second block;
      determine that said second block is not present in said virtual hard disk; and
      instruct said transport mechanism to retrieve said second block from said virtual application server.

16. The system of claim 15, said listening service further configured to:
    identify a missing block; and instruct said transport mechanism to retrieve said missing block from said virtual application server.

17. A method comprising:

receiving a request for a virtual application, said request comprising a first version identifier and being sent from a client device, said virtual application operating within an application layer separate from an operating system layer;

determining that said first version identifier is an older version than a current version, said current version being comprised in a first file;

identifying a first subset of blocks comprising a subset of said first file, said first subset being sufficient to enable said virtual application to be launched in a virtual environment on said client device;

transmitting said first subset of blocks to said client device; and receiving a request for a second block after said virtual application is operational and transmitting said second block to said client device.

18. The method of claim 17 further comprising:

sending a hash for said second block to said client device, said hash being determined from a hash tree.

19. The method of claim 17 further comprising:

creating said first file from a plurality of files comprising a non-virtual version of said virtual application;

identifying a subset of said plurality of files that enable said virtual application to launch; and causing said first subset of blocks to correspond with said subset of said plurality of files.

* * * * *